April 27, 1937.   J. W. MORGAN   2,078,454

SOUND ABSORBING AND HEAT INSULATING UNIT

Filed Oct. 26, 1935

INVENTOR.

JOHN W. MORGAN

BY

Barnes, Kisselle, Laughlin & Raisch

ATTORNEYS.

Patented Apr. 27, 1937

2,078,454

UNITED STATES PATENT OFFICE 2,078,454

SOUND ABSORBING AND HEAT INSULATING UNIT

John W. Morgan, Detroit, Mich., assignor to Zonolite Corporation of Michigan, Detroit, Mich., a corporation of Michigan Application October 26, 1935, Serial No. 46,929

8 Claims. (Cl. 138—84)

This invention relates to a sound absorbing and heat insulating unit.

There are several well known materials which are commonly used for sound absorption and heat insulation, such as asbestos fiber, rock wool, cork, and the exfoliated vermiculites, such as zonolite and jefferisite. However, in utilizing the sound absorption and heat insulating properties of these materials the fibers or granules must necessarily be held together. The necessity of tying or binding the particles of these various sound absorbing and heat insulating materials together creates the problem of thus binding the fibers or granules together with the least possible impairment of their sound absorbing and heat insulating capacity.

It is an object of this invention to produce a sound absorbing and heat insulating unit out of any of the above substances, and in particular zonolite, in which the particles will be securely bound together and having the necessary tensile strength and stiffness essential for its practical use and in which substantially the full sound absorbing and heat insulating capacity of the material is preserved.

It is also an object of this invention to produce a sound absorbing and heat insulating unit having a very high sound absorbing capacity and which readily lends itself to being fabricated either in the factory or at the actual place of installation and use.

As a sound absorbing and heat insulating material zonolite is preferred. However, asbestos fiber, rock wool, or granulated cork may also be used. For binding the particles of zonolite together or the particles of any of the other of the above mentioned sound absorbing and heat insulating materials, it is proposed to use natural clay binders such as ball clay and bentonite as well as other well known mineral binders. These particles may also be bound together by a vegetable binder such as a corn product cement.

A plaster of exfoliated zonolite, the particles of which are bound together by any of the above mentioned binders, does not have sufficient tensile strength and stiffness required for many uses, such, for example, as a wall in an air duct. To provide this necessary tensile strength and rigidity and yet maintain the original sound absorbing and heat insulating capacity of the plastic mix, it is proposed to reinforce this zonolite plaster with a foraminated reinforcement. Preferably this reinforcement takes the form of a wire mesh 1. The size of the mesh will necessarily vary according to the requirement and conditions in which the sound absorbing block or unit is used.

Figures 2, 3:
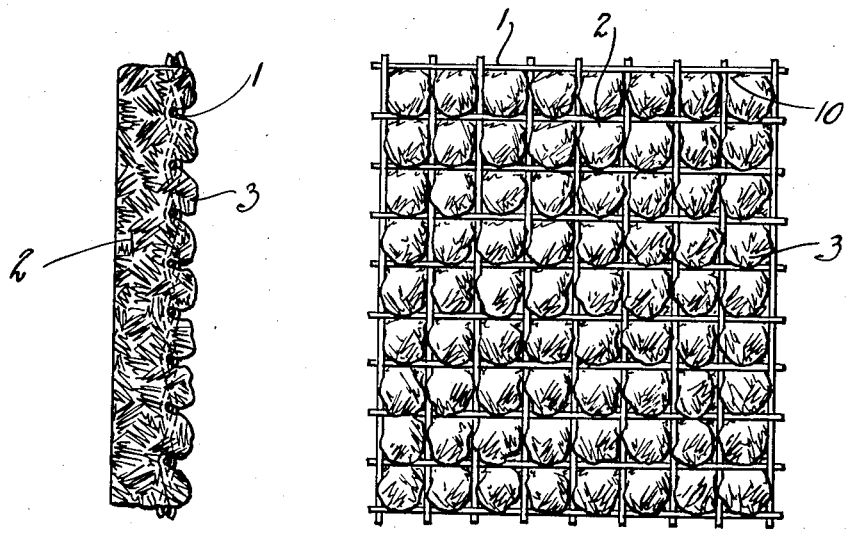
Fig. 2 is a plan view of an embodiment of the invention in the form of a sound absorbing and heat insulating block.
Fig. 3 is a sectional view showing the acoustic plaster and mesh from which both the duct and block are made.

In Fig. 2 there is shown a sound absorbing block in which the wire mesh 1 has square quarter inch openings. To the wire mesh 1 is troweled or otherwise applied the zonolite plaster 2. It will be noted that the zonolite plaster protrudes through the openings as at 3 thus forming innumerable flaky, finger-like projections. Thus the zonolite plaster is securely bound to the reinforcing wire mesh 1 and the projections 3 increase the sound absorption capacity of the block.

Figure 1:
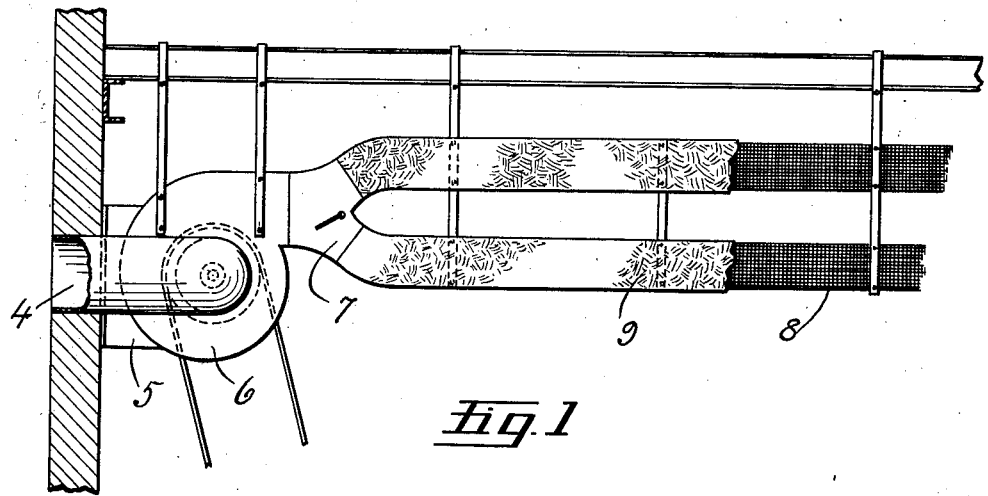
Fig. 1 shows the specific embodiment of the invention in the form of an air duct.

In Fig. 1 there is shown a heating and cooling installation comprising a fresh air inlet 4, a casing 5 in which may be mounted the conventional and well known heating and cooling coils, and a casing 6 in which may be mounted any well known fan for circulating the cooled or heated air through the ducts 7. The air ducts 7 are fabricated from a wire mesh 8 similar to that referenced 1 in Fig. 2. The mesh 8 in this particular instance is formed into a duct having a square cross section and then the zonolite plaster 9 is applied to the duct, such as by troweling the zonolite plaster on to the outside of the wire mesh. Here again the zonolite mix 2, as shown in Fig. 3, tightly adheres and binds itself to the wire mesh and numerous small finger-like projections 3 extend through the openings 10 in the mesh. These numerous finger-like projections 3 form the inside face of the duct and assist in absorbing the sound which would otherwise pass through the air ducts.

It will be noted that the mesh reinforcement 1 or 8 gives the zonolite plaster 2 considerable tensile strength and stiffness and yet at the same time exposes substantially the entire face of the zonolite plaster to the air currents. This in turn permits practically the entire sound absorbing capacity of the plaster to be used.

In an actual installation, such as shown in Fig. 1, it is found that this type of air duct very effectively silenced the noises set up by the air conditioning system. When compared with an ordinary galvanized sheet steel duct the impedance of the air flow through this zonolite duct was of no practical significance.

Although the projections 3 assist in the absorption of the sound, the length of these projections will vary with the size of the mesh used. Even when a wire mesh is used where the openings are so small that the zonolite plaster barely projects beyond the inner face of the mesh, still the sound absorbing capacity of this reinforced zonolite plaster unit is very high.

I claim:

1. A duct comprising in combination a foraminated reinforcing member shaped in the form of a duct, a plaster coating applied to the outside of the said duct of a sound absorbing and heat insulating material, the said plaster projecting through the openings in the said reinforcement to form a plurality of spaced, finger-like projections on the inside of the said duct.

2. A duct comprising in combination a continuous wire mesh formed in the shape of a duct and a plaster coating for the said wire mesh of a sound absorbing and heat insulating material, the said plaster projecting through the openings in the said mesh to form a plurality of spaced, finger-like projections on the inside of the said duct.

3. A sound absorbing and heat insulating duct comprising in combination a foraminated reinforcing member shaped in the form of a duct, a plaster coating of exfoliated vermiculite and a binder applied as a plastic to the outside of the said duct.

4. A sound absorbing and heat insulating duct comprising in combination a foraminated reinforcing member shaped in the form of a duct, a plaster coating of exfoliated vermiculite and a binder applied as a plastic to the outside of the duct, the said plaster projecting through the openings in the said reinforcing member to form a plurality of spaced, flaky, finger-like projections.

5. A sound absorbing and heat insulating duct comprising in combination a wire mesh reinforcing member shaped in the form of a duct, a plaster coating of exfoliated vermiculite and a binder applied as a plastic to the outside of the duct, the said plaster projecting through the openings in the said reinforcing member to form a plurality of spaced, flaky, finger-like projections.

6. A sound absorbing and heat insulating duct comprising in combination a foraminated reinforcing member shaped in the form of a duct, a plaster coating of sound absorbing and heat insulating material and a binder of ball clay applied as a plastic to the outside of the said duct.

7. A duct comprising top, bottom and side walls one or more of which comprise a foraminated reinforcing member and a plaster coating of sound absorbing and heat insulating material applied to the outside of the said wall, the said plaster projecting through the openings in the said foraminated reinforcement to form a plurality of spaced, finger-like projections on the inside of the wall of the said duct.

8. A duct for conducting air and the like having a substantial portion of its wall area comprising a foraminated reinforcing member, a plaster coating of a sound absorbing and heat insulating material applied as a plastic to the outside of the foraminated reinforcing member, the said plaster projecting through the openings in the said reinforcement to form a plurality of spaced, finger-like projections on the inside of the said duct.

JOHN W. MORGAN.